United States Patent [15] 3,656,794
McCord [45] Apr. 18, 1972

[54] VACUUM CUP LIFTER FOR SHELL EGGS

[72] Inventor: Robert C. McCord, Romulus, Mich.

[73] Assignee: Diamond International Corporation, New York, N.Y.

[22] Filed: Jan. 21, 1971

[21] Appl. No.: 108,399

[52] U.S. Cl. .......................................................294/64 R
[51] Int. Cl. .................................................................B66c 1/02
[58] Field of Search.............................294/64, 65; 271/26

[56] References Cited

UNITED STATES PATENTS 2,798,757  7/1957  Jackson................................294/64 R
2,850,279  9/1958  Stoothoff et al. ........................271/26
3,330,589  7/1967  Mumma...............................294/64 R Primary Examiner—Evon C. Blunk
Assistant Examiner—Johnny D. Cherry
Attorney—Karl W. Flocks

[57] ABSTRACT

A vacuum cup lifter having a neck portion adapted to be connected to a vacuum means, a thin flexible lip particularly adapted to lifting shell eggs to be transported and deposited for processing or packing, and intermediate bell portions providing gentle yet stable lifting and carrying characteristics.

6 Claims, 6 Drawing Figures

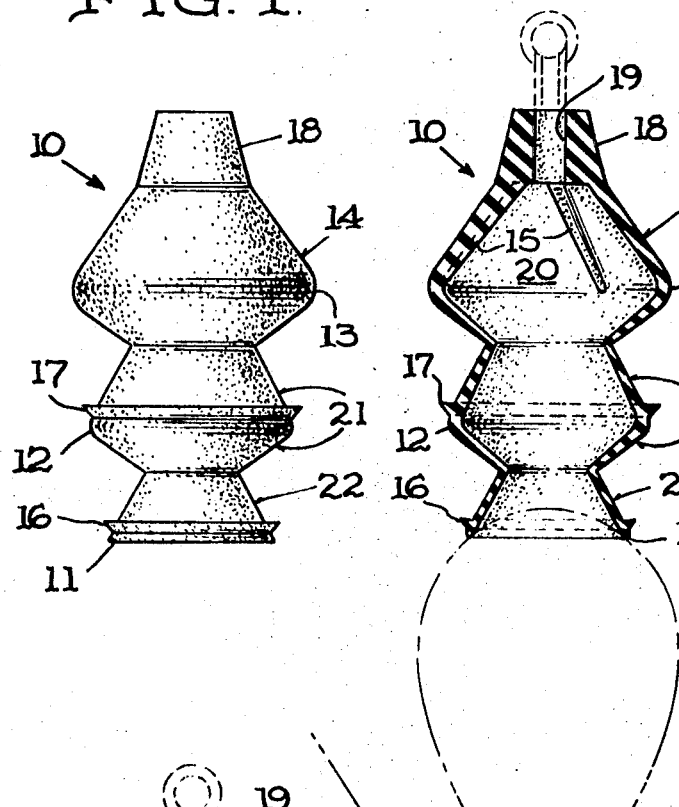

VACUUM CUP LIFTER FOR SHELL EGGS

This invention relates to an improved lifting and carrying device and more particularly to an improved device which is operated by vacuum means.

Although this specification describes the function and operation of the invention as applied to the handling of eggs, it is to be clearly understood that it is equally effective when applied to the handling of other items having a generally convex surface portion.

With the advent of automatic high speed egg processing, various bulk egg handling devices have been devised. U.S. Pat. No. 2,798,757 shows a typical example of one of these egg handling devices, which is capable of placing an entire filler flat of eggs on a loading station. Some of these egg handling devices are machine-operated to carry an entire flat of eggs to the loading station, while other such devices are hand carried to the loading station.

In the patent mentioned above, the handling device comprises a plurality of resilient collapsible vacuum cups which are arranged in grid-like fashion on a vacuum manifold support plate. In operation the support plate is positioned above a flat of eggs and lowered to engage the distal end of each of the vacuum cups with the eggs, at which time, suitable controls are actuated to evacuate the vacuum cups. As a vacuum is applied to the vacuum cups, they collapse or retract and lift the eggs, which may then be moved en masse to a processing or packing station.

In egg handling devices of the type described above, certain problems have been encountered by egg processing personnel. One of the problems frequently encountered is the failure of some vacuum cups to pick up eggs having a moderate amount of dirt on their egg contacting surfaces due to the failure of the vacuum cups to form an adequate seal to effect the necessary lift.

Another source of problem is the excessive rigidity of the egg contacting portions of some vacuum cups, which frequently cause eggs to be lifted and deposited with excessive end pressures and cause breakage. An additional problem frequently encountered in the use of these machines lies in the fact that many vacuum cups lack the necessary lateral rigidity so that when the eggs are airborne, they are subjected to a lateral or swinging movement and in fact tend to result in breakage because of collision between adjacent eggs.

With the foregoing in mind it is a primary object of this invention to provide an improved vacuum cup which will gently pick up shell eggs.

Another object of this invention is to provide an improved vacuum cup which will reliably pick up and transfer shell eggs from one container to a processing station to another.

An additional object of this invention is to provide an improved vacuum cup lifter which is not significantly sensitive to moderately dirty eggs from a vacuum seal standpoint.

A further object of this invention is to provide a vacuum cup having a retractable or collapsible height to adapt itself to handling eggs ranging from pee-wees to super-jumbos in size.

A still further object of this invention is to provide a vacuum cup having gentle physical contact and light end pressure on eggs.

Yet another object of this invention is to provide a vacuum cup with an egg contacting throat and lip having high conformity to all sizes, shapes, and positions of eggs.

Yet further object of this invention is to provide a vacuum cup formed with stress areas which are closely controlled to allow minimum vacuum for lifting and yet assure reliable protraction upon vacuum relief.

These and other objects will be readily apparent with reference to the following description and the accompanying drawings in which:

FIG. 1 is an elevation view of the structure constituting my novel vacuum cup lifting device;

FIG. 2 is an elevation view in section of the device shown in FIG. 1;

FIG. 3 is a top plan view of the device shown in FIG. 1;

FIG. 4 is a bottom plan view of the device shown in FIG. 1;

FIG. 5 is an elevation view in section of my novel vacuum lifting cup in its collapsed, egg carrying form; and FIG. 6 is an elevation view of my novel vacuum lifting cup and it is depositing an egg.

Referring to the drawings, it is seen in FIGS. 1-4 that the vacuum cup 10, which constitutes my novel article handling device, includes a neck portion 18 which may be pressed onto a suitable holder (shown in phantom in FIG. 2). The vacuum may be made of rubber or other similarly resilient materials. The neck portion 18 includes a hole 19 through which a vacuum may be induced by way of conventional conduits (not shown) and applied to an internal chamber 20 of the cup 10 to lift an object such as an egg. At its distal end the cup 10 has a very thin generally conically shaped suction throat 22 terminating in a lower or outer lip portion 11 and is highly conformable to all sizes, shapes, and positions of eggs. Because of the flexibility of the thin suction throat 22 and lip portion 11, the cup 10 is provided with a minimum sensitivity to dirty eggs and thus accommodates some dirt on the surface of an egg and yet is still able to form a vacuum seal thereon. Intermediate of the neck 18 and throat 22 the cup 10 is provided with integral upper and lower bells 14 and 21, respectively. Extending from the neck 18 toward the throat 22, the upper and lower bells 14 and 21 each have a diverging and then a converging section. The intersection of the diverging and converging sections of the upper and lower bells 14 and 21 are each provided with annular pre-stressed areas 13 and 12, respectively. These pre-stressed areas are closely controlled to allow minimum vacuum and yet assure reliable protraction upon vacuum relief. The upper bell 14 is also provided internally thereof with a plurality of circumferentially spaced, longitudinally extending stiffening ribs 15, as shown in FIGS. 2 and 4, which provide radial stability under maximum vacuum conditions.

Externally of the vacuum cup 10 annular stop flanges 16 and 17 are provided around the lower portion of throat 22 and the central portion of the lower bell 21, respectively.

In operation when the vacuum cup 10 is lowered so that the lower lip portion 11 is brought into close proximity of or contact with an egg at a first station as shown in FIG. 2, a vacuum seal is normally effected. As the air is evacuated from chamber 20, the throat 22 and the lower bell 21 retract inwardly (as indicated by the arrows) from the position in phantom toward the solid position where the upper bell 14 until stop flanges 16 and 17, respectively, prevent further retraction thereof as shown in FIG. 5. At this point it is seen that the throat 22 and the lower bell 21 have telescoped into the lower bell 21 and the upper bell 14, respectively, where the egg is rigidly held until the vacuum is released and the egg is deposited for further processing or packaging as seen in FIG. 6 with release of the egg providing prompt and full protraction to the phantom edge. With the throat 22 and the lower bell 21 telescoped into the lower bell 21 and upper bell 14, respectively, it is clear that lateral movement of these parts will be restricted by reason of the thickened stiffening ribs 15 located internally of upper bell 14. Because of the stiffening ribs 15 the eggs are carried with great stability. The egg lifted and thus held by the vacuum cup 10 may then be transported to and deposited at another location for further processing or packing as shown in FIG. 6, along with others being carried by the egg handling device of which the vacuum cup 10 forms a part. Of course, in depositing the eggs the vacuum cup 10, is lowered (as indicated by the arrows) to the resting place for the egg and the vacuum is relieved from chamber 20, whereupon the pre-stressed areas 12 and 13 complement the natural tendency of the vacuum cup 10 to distend or protract to its free form as mentioned above.

While my invention has been described with certain degree of particularity, it is understood that the present disclosure has been made only by way of example and that various changes may be made without departing from the spirit and scope of the invention as hereinafter claimed.

What is claimed is:

1. A vacuum cup lifter particularly adapted to lifting shell eggs or other convexly shaped articles comprising a deformable hollow tubular member having a neck portion for attachment to a lifting device, a chamber defined by an upper bell, a lower bell and a suction throat, and a hole extending through said neck portion in communication with said chamber and for connection with a vacuum source;

said upper bell and said lower bell each including a diverging section and then a converging section;

said diverging and converging sections of each of said upper and lower bells intersecting in a pre-stressed annular portion which tends to urge said vacuum cup to a distended free form from a collapsed or retracted form;

said upper and lower bells and said suction throat being so dimensioned that on application of a vacuum said throat telescopes into said lower bell and said lower bell and said throat together telescope into said upper bell; and said throat and said lower bell each including an annular stop flange around the outer periphery thereof to limit the amount that said throat and said lower bell may collapse or retract into said lower bell and said upper bell, respectively.

2. The vacuum cup lifter of claim 1 wherein said upper bell includes a plurality of circumferentially spaced, longitudinally extending stiffening ribs.

3. The vacuum cup lifter of claim 1 wherein said suction throat is of generally conical configuration and includes a lower lip portion.

4. The vacuum cup lifter of claim 1 wherein said suction throat is extremely thin and flexible in comparison with the upper and lower bells from which it extends.

5. The vacuum claim lifter of claim 4 wherein said suction throat has extending distally therefrom a very thin and flexible lip.

6. The vacuum cup lifter of claim 1 wherein the annular stop flange around said throat lies adjacent the free end thereof.

* * * * *